US006766893B2

(12) United States Patent
Neumann et al.

(10) Patent No.: US 6,766,893 B2
(45) Date of Patent: Jul. 27, 2004

(54) METHOD AND DEVICE FOR CONTROLLING THE BRAKE(S) OF A DEVICE FOR TRANSPORTING PEOPLE

(75) Inventors: Sascha Neumann, Bochum (DE); Andreas Tautz, Waltrop (DE)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 10/345,153

(22) Filed: Jan. 16, 2003

(65) Prior Publication Data

US 2003/0102199 A1 Jun. 5, 2003

Related U.S. Application Data

(63) Continuation of application No. 10/268,915, filed on Oct. 11, 2002, now abandoned, which is a continuation of application No. PCT/EP01/02662, filed on Mar. 9, 2001.

(30) Foreign Application Priority Data

Apr. 14, 2000 (DE) ........................................ 100 18 887

(51) Int. Cl.[7] ................................................ B65G 15/00
(52) U.S. Cl. ....................................... 198/322; 198/323
(58) Field of Search ................................ 198/322, 323, 198/330

(56) References Cited

U.S. PATENT DOCUMENTS

| | | | | | |
|---|---|---|---|---|---|
| 3,896,925 | A | * | 7/1975 | Mitsui et al. | 198/323 |
| 4,499,986 | A | * | 2/1985 | Tsuboi et al. | 198/322 |
| 4,588,065 | A | * | 5/1986 | Maiden et al. | 198/323 |
| 5,083,653 | A | | 1/1992 | Sakata et al. | |
| 5,099,977 | A | * | 3/1992 | Hirose et al. | 198/323 |
| 5,272,428 | A | * | 12/1993 | Spiegel et al. | 318/803 |
| 5,482,153 | A | * | 1/1996 | Abraham et al. | 198/322 |
| 5,564,550 | A | * | 10/1996 | van Rooy et al. | 198/322 |
| 5,708,416 | A | * | 1/1998 | Zaharia et al. | 340/531 |
| 5,886,497 | A | * | 3/1999 | Zaharia | 318/779 |
| 5,992,604 | A | * | 11/1999 | Buescher et al. | 198/322 |
| 6,230,871 | B1 | * | 5/2001 | Balzer-Apke et al. | 198/323 |
| 6,267,219 | B1 | * | 7/2001 | Spannhake et al. | 198/323 |
| 6,273,234 | B1 | * | 8/2001 | Balzer-Apke et al. | 198/323 |
| 6,520,300 | B2 | * | 2/2003 | Balzer-Apke et al. | 188/181 C |
| 6,606,538 | B2 | * | 8/2003 | Ponsot et al. | 700/230 |

FOREIGN PATENT DOCUMENTS

| | | |
|---|---|---|
| DE | 19754141 A1 | 6/1999 |
| DE | 19803899 | 8/1999 |
| DE | 19935521 | 2/2001 |
| FR | 2 464 912 | 9/1979 |

* cited by examiner

*Primary Examiner*—Douglas Hess
(74) *Attorney, Agent, or Firm*—Venable LLP; Robert Kinberg

(57) ABSTRACT

A method and arrangement for controlling the respective brake of a device for transporting people, such as an escalator or a moving pavement in that the control signals for the drive motors and the brake are monitored with the aid of several processors. If functional interruptions occur in the region of the device for transporting people, the brake is applied abruptly. If deceleration values are detected, the brake is relieved in a defined manner and the device for transporting people is thus stopped via the processors within a predetermined time interval.

9 Claims, 1 Drawing Sheet

METHOD AND DEVICE FOR CONTROLLING THE BRAKE(S) OF A DEVICE FOR TRANSPORTING PEOPLE

CROSS REFERENCE TO RELATED APPLICATIONS

This application is a continuation of U.S. application Ser. No. 10/268,915 now abandoned filed on Oct. 11, 2002, which was a continuation of International Application No. PCT/EP01/02662 filed Mar. 9, 2001, which claims priority from German Patent Application 100 18 887.7 filed Apr. 14, 2000, both of which are incorporated herein by reference.

FIELD OF THE INVENTION

The invention relates to a method and arrangement for controlling the brake(s) of a device for transporting people, such as an escalator or a moving sidewalk.

BACKGROUND OF THE INVENTION

According to presently applicable domestic and foreign safety regulations, escalators and moving sidewalks must be provided with mechanisms that automatically stop them before the speed exceeds, for example, 1.2 times the value of the nominal speed. In the same way, they must be stopped as soon as malfunctions occur in a region of the escalators or the moving sidewalk, for example if a safety switch is activated.

Mechanical brakes, such as block brakes, are frequently used for escalators and moving sidewalks and are applied abruptly in case of a malfunction, given the currently used controls.

One disadvantage with such mechanical brakes is persons standing on the escalator or on the moving sidewalk under some circumstances can fall and hurt themselves as a result of the abrupt application of the brake.

A further disadvantage is that if the brake linings are worn, the braking distance is extended, even if the brake is applied abruptly.

When these functional interruptions occur in a region of the transporting device, conventional solutions apply a full braking operation to stop the motor. However, a full braking operation in some circumstances could cause persons on the device for transporting people to fall down as a result of the abrupt deceleration of the device for transporting people. Thus, what is needed is a method and corresponding arrangement for the controlled braking of a device for transporting people, which nevertheless meets all relevant domestic and foreign safety standards.

SUMMARY OF THE INVENTION

It is an object of this invention to provide a method and a device for controlling the brake(s) of a device for transporting people, such as an escalator or a moving sidewalk, which make it possible to maintain for the most part essentially the same braking distance, even if the brake linings are worn, without this resulting in injury to persons.

This object is achieved by a method for controlling the respective brake of a device for transporting people, such as an escalator or a moving sidewalk, by monitoring the control signals from the drive motor and the brake with the aid of several processors, by applying the brake abruptly during functional interruptions in a region of the device for transporting people, by relieving the brake(s) in a defined manner if deceleration values are detected and by subsequently stopping the device for transporting people with the aid of the processors within a predetermined time interval.

The above object is further achieved with a device for controlling the respective brake of a device for transporting people, having at least two processors that monitor each other and are connected via driver elements to the switching elements for the brake.

Further features and advantages of the invention, as well as the structure and operation of various embodiments of the invention, are described in detail below with reference to the accompanying drawings.

BRIEF DESCRIPTION OF THE DRAWINGS

The foregoing and other features and advantages of the invention will be apparent from the following, more particular description of a preferred embodiment of the invention, as illustrated in the accompanying drawings wherein like reference numbers generally indicate identical, functionally similar, and/or structurally similar elements.

DETAILED DESCRIPTION OF THE INVENTION

Figure 1:
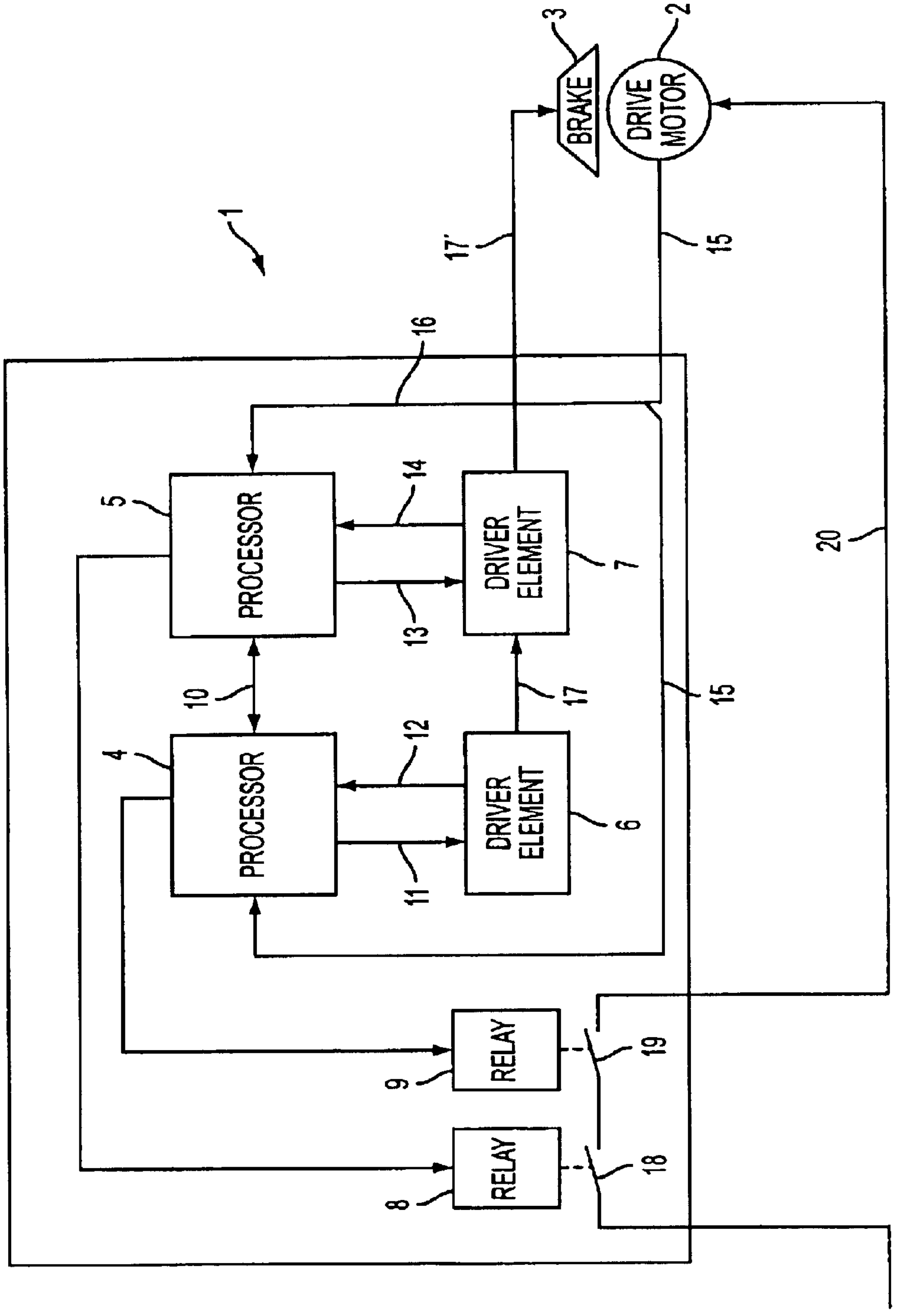
FIG. 1 depicts an exemplary embodiment of an arrangement for braking a device for transporting people according to the present invention.

A preferred embodiment of the invention is discussed in detail below. While specific exemplary embodiments are discussed, it should be understood that this is done for illustration purposes only. A person skilled in the relevant art will recognize that other components and configurations can be used without parting from the spirit and scope of the invention.

The control device according to the present invention depends on the presently applicable domestic and foreign safety regulations. This type of control for the brake(s), not yet implemented in escalators and moving sidewalks, corresponds to the present level of technology and also meets the relevant domestic and foreign safety standards.

In view of the fact that the actuation of the switching elements for the brake(s) can be realized in the low-voltage range (24 V), the 220 V voltage used in this range so far is no longer present, thus increasing the safety even further.

At least two microprocessors are used, which on the one hand monitor each other and on the other hand monitor the control signals coming from the brake and the drive motor and/or adjust these.

The control of the device is based on fuzzy logic, which is known per se. For this, a memory stores the most varied minimum and maximum values and from these generates at least one average value that is used as orientation value for the processors and/or the braking behavior.

The respective brake remains relieved, as is the case according to the prior art used so far. The brake is furthermore applied abruptly in case of malfunctions, as is the case so far. If additional malfunctions occur in the control unit range (of at least one processor), meaning if no deceleration is detected via the adjustment unit, the brake remains applied, thus conforming to the known prior art.

However, this is not very likely since a deceleration value will be detected owing to the redundancy of the processors, so that the control schema (fuzzy logic) can be set in motion. The control schema ensures that the respective brake is again relieved in a defined manner, which improves the full-braking state in favor of the persons located on the escalator and/or the moving sidewalk. To be sure, the persons located on the escalator and/or the moving sidewalk notice when the brake is applied since a stronger deceleration occurs for a brief moment. However, as soon as the processor or processors has (have) detected the deceleration, the respective brake is again relieved. Thus, the brake can be inactivated within a braking distance that meets the safety standard and during an adjustable time interval, so that injury to persons is prevented.

The processors that monitor each other form a so-called security system. Each of these processors actuates at least one driver element since only the respective driver elements, but not the individual processors themselves can generate 24 V signals. The 24 V signal generated by the driver element functions as an actuation voltage for the respective switching element of the respective brake. The switching element generally is a brake magnet.

The driver elements represent a two-channel or a multichannel system, which can cause a full braking operation even if one of the processors malfunctions. A full braking operation, as known from the state of the technology, of the device for transporting people is thus ensured even during a malfunction of one of the processors.

In addition, the processors act upon control relays used to switch off the drive motor as soon as the brake is applied. This is tied to the advantage that the effective braking force is not forced to work against the running motor, which may cause further damages.

An arrangement for implementing the above-described method can be shown with the aid of an exemplary embodiment in the drawing and is described as follows.

The single Figure shows the control device 1 according to the invention. In order to simplify, only the components relevant to the invention are shown. The drive motor 2 of an escalator or a moving sidewalk, not shown in further detail herein, as well as the operatively connected brake 3 can be seen herein. The control device 1 comprises two microprocessors 4, 5 that monitor each other. Each of the microprocessors 4, 5 is operatively connected to a driver element 6, 7. In addition, each of the microprocessors 4, 5 acts upon an associated relay 8, 9.

The processors 4, 5 are operatively connected via a signal line 10, so that they can mutually monitor their operational behavior. The processors 4, 5 are also operatively connected via additional lines 11, 12, 13, 14 to the driver elements 6, 7. Additional signal lines 15, 16 are provided between the drive motor 2 and the respective processor 4, 5. The driver elements 6, 7 are operatively connected to each other via a line 17, which is continued as line 17' and acts upon switching elements of the brake 3 that are not shown in further detail herein. The relays 8, 9 are connected via the switch 18, 19, as well as a single line 20 to the drive motor 2.

The control device operates according to fuzzy logic that is known per se, wherein minimum and maximum values are stored in the microprocessor range. Thus, at least one average value corresponding to the safety standards can be generated, on which the control schema for the brake 3 can orient itself. As previously mentioned, the processors 4, 5 monitor each other, so that both always have the same data level. As long as the device for transporting people operates without malfunctions, the brake 3 control element that is not shown in further detail herein remains alive, meaning the brake 3 is relieved, so that the drive motor 2 can operate without being stopped. In case of an interruption in the operation, meaning if both processors 4, 5 have detected this interruption and the data compensation shows matching data, corresponding signals are conducted to the driver elements 6, 7, which then apply the brake 3 abruptly.

The drive motor 2 is stopped at the same time via the relays 8, 9 and the line 20 so that the effective braking energy is not forced to work against the running motor. If the processors 4, 5 detect deceleration values in the drive motor 2 range, the control schema according to the invention starts. That is to say, the brake 3 is again relieved in a defined manner via the associated switching elements and the device for transporting people is stopped within a predetermined braking distance and time interval that correspond to the safety standard.

The persons on the device for transporting people thus experience a brief deceleration impulse, which is not continuous however, but is eliminated again. Thus, no injuries to persons can occur because of the controlled adjustment according to the invention. If one of the processors 4, 5 should fail, meaning the two processors 4, 5 do not exchange compatible data sets, the brake 3 is abruptly applied via the associated driver 6 or 7 and the line 17 and/or 17'. That is to say, a full braking operation takes place, such as is known from prior art.

Thus, even if the control unit 1 fails (processor 4 or 5), a full braking operation, which so far has represented the safety standard, is ensured in addition to the comfortable adjustment of the brake 3 for the device for transporting people.

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A method for controlling an arrangement for transporting people, which includes a transporting device, a drive motor and a brake coupled to the transporting device for engaging and disengaging the transporting device, and a control device coupled to the drive motor and the brake and including at least two processors, the method comprising the steps of;

monitoring control signals from the drive motor and the brake in the processors;

applying the brake abruptly when a functional interruption occurs in a region of the transporting device;

relieving the applied brake in a defined manner if deceleration values are detected; and stopping the transporting device via the processors within a predetermined time interval.

2. The method according to claim 1, wherein the at least two processors monitor each other.

3. The method according to claim 1, wherein each of the at least two processors is associated with at least one driver element and wherein the brake includes switching elements, further comprising the step of:

actuating the at least one driver element with one of the processors for cooperating with the switching elements of the brake.

4. The method according to claim 3, including generating in the at least one driver element a 24V signal.

5. The method according to claim 3, further comprising the step of:

realizing an abrupt application of the brake via one of the driver elements even if one of the at least two processors malfunctions.

6. The method according to claim 1, including performing the steps based on fuzzy logic.

7. The method according to claim 1, wherein the control device includes relays associated with the at least two processors, further comprising the steps of:

activating the relays when the brake is applied; and shutting down the drive motor.

8. An arrangement for braking a device for transporting people, comprising:

a drive motor and a brake for being coupled to the transporting device, wherein the brake comprises switching elements;

a control device comprising at least two processors, wherein the processors are coupled for monitoring each other;

at least two driver elements that couple the at least two processors to the switching elements of the brake; and at least two relays coupled to the drive motor, each relay being associated with one of the at least two processors, wherein the processors cooperate with the associated relays to control the drive motor.

9. The arrangement according to claim 5, wherein each driver element generates a 24V signal which serves as an actuation voltage for the switching element of the brake.

* * * * *